(12) United States Patent
Yamashita et al.

(10) Patent No.: US 11,381,458 B2
(45) Date of Patent: Jul. 5, 2022

(54) NETWORK MANAGEMENT DEVICE, CONTROL CIRCUIT, AND RECORDING MEDIUM

(71) Applicant: Mitsubishi Electric Corporation, Tokyo (JP)

(72) Inventors: Yasutaka Yamashita, Tokyo (JP); Shigenori Tani, Tokyo (JP); Katsuyuki Motoyoshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 113 days.

(21) Appl. No.: 16/847,011

(22) Filed: Apr. 13, 2020

(65) Prior Publication Data
US 2020/0244540 A1   Jul. 30, 2020

Related U.S. Application Data

(63) Continuation of application No. PCT/JP2017/042537, filed on Nov. 28, 2017.

(51) Int. Cl.
*H04L 12/24* (2006.01)
*H04L 41/12* (2022.01)
(Continued)

(52) U.S. Cl.
CPC .......... *H04L 41/12* (2013.01); *H04L 41/0816* (2013.01); *H04L 41/0866* (2013.01);
(Continued)

(58) Field of Classification Search
CPC . H04L 41/12; H04L 41/0816; H04L 41/0866; H04L 41/0886; H04L 41/22; H04L 43/0811; H04L 45/02
See application file for complete search history.

(56) References Cited

U.S. PATENT DOCUMENTS

| 2005/0047327 A1* | 3/2005 | Saleh | H04L 45/04 370/221 |
| 2009/0185508 A1* | 7/2009 | Duke | H04W 40/246 370/255 |

(Continued)

FOREIGN PATENT DOCUMENTS

JP   6091378 B2   3/2017

OTHER PUBLICATIONS

Eckford et al., "On Estimating the Topology of an Adversarial Wireless Network," 2008 IEEE Internaional Confernce on Communications, Beijing, 2008, pp. 2460-2465.
(Continued)

*Primary Examiner* — Christopher B Robinson
(74) *Attorney, Agent, or Firm* — Birch, Stewart, Kolasch & Birch, LLP.

(57) ABSTRACT

A network management device according to the present invention includes a metric calculation unit that calculates, using location information of multiple nodes constituting a network, metrics for respective combinations of the nodes, a false detection determination unit that determines, using the metrics and using link estimation information, which is information indicating a combination of nodes presumed that has a link therebetween, a falsely detected link corresponding to a combination of nodes indicated as having a link therebetween in the link estimation information, but presumed that has no link therebetween in reality, and a non-detection determination unit that determines, using the metrics and the link estimation information, an undetected link corresponding to a combination of nodes indicated as having no link therebetween in the link estimation information, but presumed that has a link therebetween in reality.

12 Claims, 12 Drawing Sheets

(51) Int. Cl.
*H04L 41/0816* (2022.01)
*H04L 41/0866* (2022.01)
*H04L 41/08* (2022.01)
*H04L 41/22* (2022.01)
*H04L 43/0811* (2022.01)
*H04L 45/02* (2022.01)

(52) U.S. Cl.
CPC .......... *H04L 41/0886* (2013.01); *H04L 41/22* (2013.01); *H04L 43/0811* (2013.01); *H04L 45/02* (2013.01)

(56) References Cited

U.S. PATENT DOCUMENTS

| | | | | |
|---|---|---|---|---|
| 2010/0023554 | A1* | 1/2010 | Fujimoto | G06F 16/29 707/E17.005 |
| 2013/0163471 | A1* | 6/2013 | Indukuri | G06Q 10/00 370/255 |
| 2015/0304130 | A1* | 10/2015 | Logothetis | H04L 1/203 455/115.2 |

OTHER PUBLICATIONS

Tilphman et al., "Inferring Wireless Communications Links and Network Topology from Externals using Granger Causality," 2013 IEEE Military Communications Conference, 2013, pp. 1284-1289.
Canadian Office Action for Canadian Application No. 3,080,455, dated May 31, 2021.
Extended European Search Report for European Application No. 17933530.2, dated Aug. 25, 2020.

\* cited by examiner

LOCATION INFORMATION TABLE

| NODE | X COORDINATE | Y COORDINATE | Z COORDINATE |
|---|---|---|---|
| N-1 | 0.0 | 1.0 | 4.0 |
| N-2 | 10.0 | 15.0 | 5.0 |
| ... | ... | ... | ... |
| N-8 | 20.0 | 3.0 | 2.0 |

FIG.5

LINK ESTIMATION TABLE

| NODE A | NODE B |
|---|---|
| N-1 | N-2 |
| N-1 | N-5 |
| N-2 | N-4 |
| ... | ... |
| N-7 | N-8 |

FIG.6

LINK PRESENCE-ABSENCE TABLE

| NODE A | NODE B | METRIC | LINK PRESENCE-ABSENCE |
|---|---|---|---|
| N-1 | N-2 | 47.2 | PRESENT |
| N-1 | N-3 | 50.4 | ABSENT |
| N-1 | N-4 | 120.3 | ABSENT |
| ... | ... | ... | ... |
| N-7 | N-8 | 100.0 | PRESENT |

NETWORK MANAGEMENT DEVICE, CONTROL CIRCUIT, AND RECORDING MEDIUM

CROSS-REFERENCE TO RELATED APPLICATION

This application is a continuation application of International Application PCT/JP2017/042537, filed on Nov. 28, 2017, and designating the U.S., the entire contents of which are incorporated herein by reference.

BACKGROUND OF THE INVENTION

1. Field of the Invention

The present invention relates to a network management device that manages the configuration of a wireless ad hoc network.

2. Description of the Related Art

In maintaining or managing a wireless ad hoc network, knowing the configuration of that wireless ad hoc network is of importance to the administrator. A network configuration estimation device may be used to allow the administrator to know the configuration of a wireless ad hoc network. Japanese Patent No. 6091378 discloses a network configuration estimation device that analyzes the emission patterns of radio waves emitted by respective nodes in a wireless ad hoc network, determines that a pair of nodes that each emit a radio wave within a certain time period has a link therebetween, that is, such pair of nodes are nodes adjacent to each other, and thus estimates the configuration of the wireless ad hoc network.

However, the above conventional network configuration estimation device may determine that multiple nodes, located distant from each other having no link therebetween in reality, have a link therebetween when the nodes each emit a radio wave incidentally within a certain time period. Or, the above conventional network configuration estimation device may determine that a pair of nodes located adjacent to each other has no link therebetween due to no radio wave being emitted by the nodes during observation. This presents a problem of decrease in accuracy of estimation of the network configuration.

The present invention has been made in view of the foregoing, and it is an object of the present invention to provide a network management device that provides reduction in decrease in accuracy of estimation of the network configuration.

SUMMARY OF THE INVENTION

To solve the aforementioned problems and achieve the object, a network management device according to the present invention includes: a metric calculation unit to calculate, using location information of a plurality of nodes constituting a network, metrics for respective combinations of the nodes; a false detection determination unit to determine, using the metrics and using link estimation information being information indicating a combination of the nodes presumed that has a link therebetween, a falsely detected link corresponding to a combination of the nodes indicated as having a link therebetween in the link estimation information, but presumed that has no link therebetween in reality; and a non-detection determination unit to determine, using the metrics and the link estimation information, an undetected link corresponding to a combination of the nodes indicated as having no link therebetween in the link estimation information, but presumed that has a link therebetween in reality.

BRIEF DESCRIPTION OF THE DRAWINGS

FIG. 5 is a chart illustrating an example of link estimation table according to the first embodiment.

FIG. 6 is a chart illustrating an example of link presence-absence table according to the first embodiment.

DETAILED DESCRIPTION OF THE PREFERRED EMBODIMENTS

A network management device according to embodiments of the present invention will be described in detail below with reference to the drawings. Note that these embodiments are not intended to limit the scope of this invention.

First Embodiment

Figure 1:
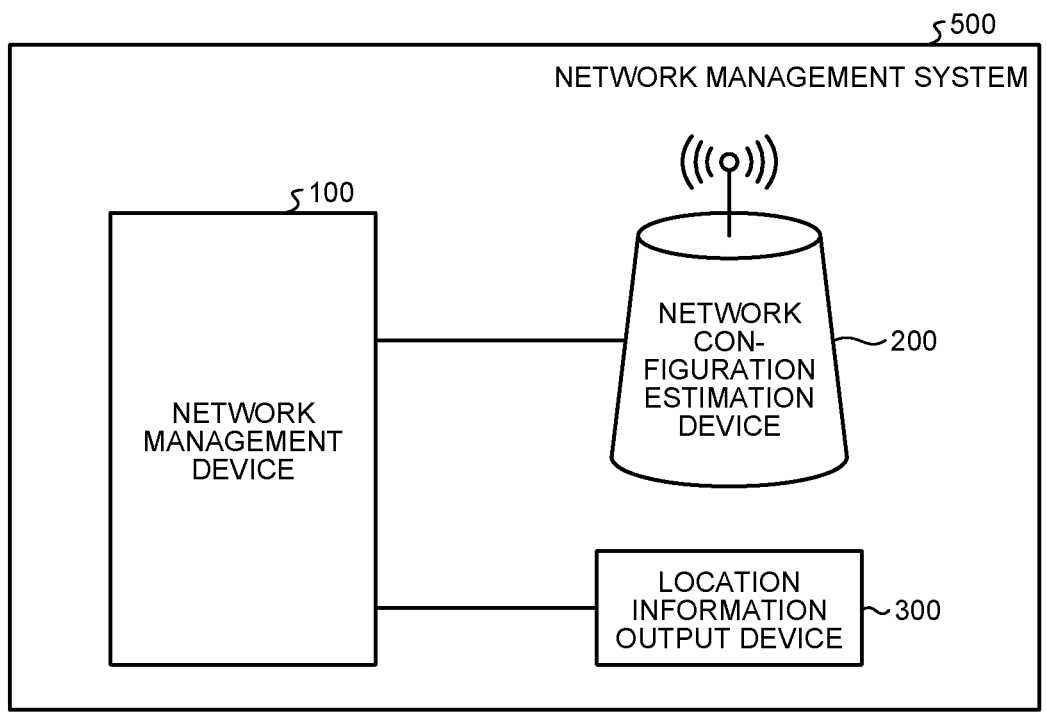
FIG. 1 is a diagram illustrating an example of the configuration of a network management system according to a first embodiment.

FIG. 1 is a diagram illustrating an example of the configuration of a network management system according to a first embodiment. A network management system 500 includes a network management device 100, a network configuration estimation device 200, and a location information output device 300. The network management system 500 manages a network. The network management device 100 is connected to each of the network configuration estimation device 200 and the location information output device 300. The network configuration estimation device 200 generates a link estimation table, which provides information indicating a network configuration, and outputs the link estimation table to the network management device 100. The location information output device 300 outputs a location information table, which provides information indicating the locations of respective nodes, to the network management device 100. The link estimation table is also referred to as link estimation information.

Figure 2:
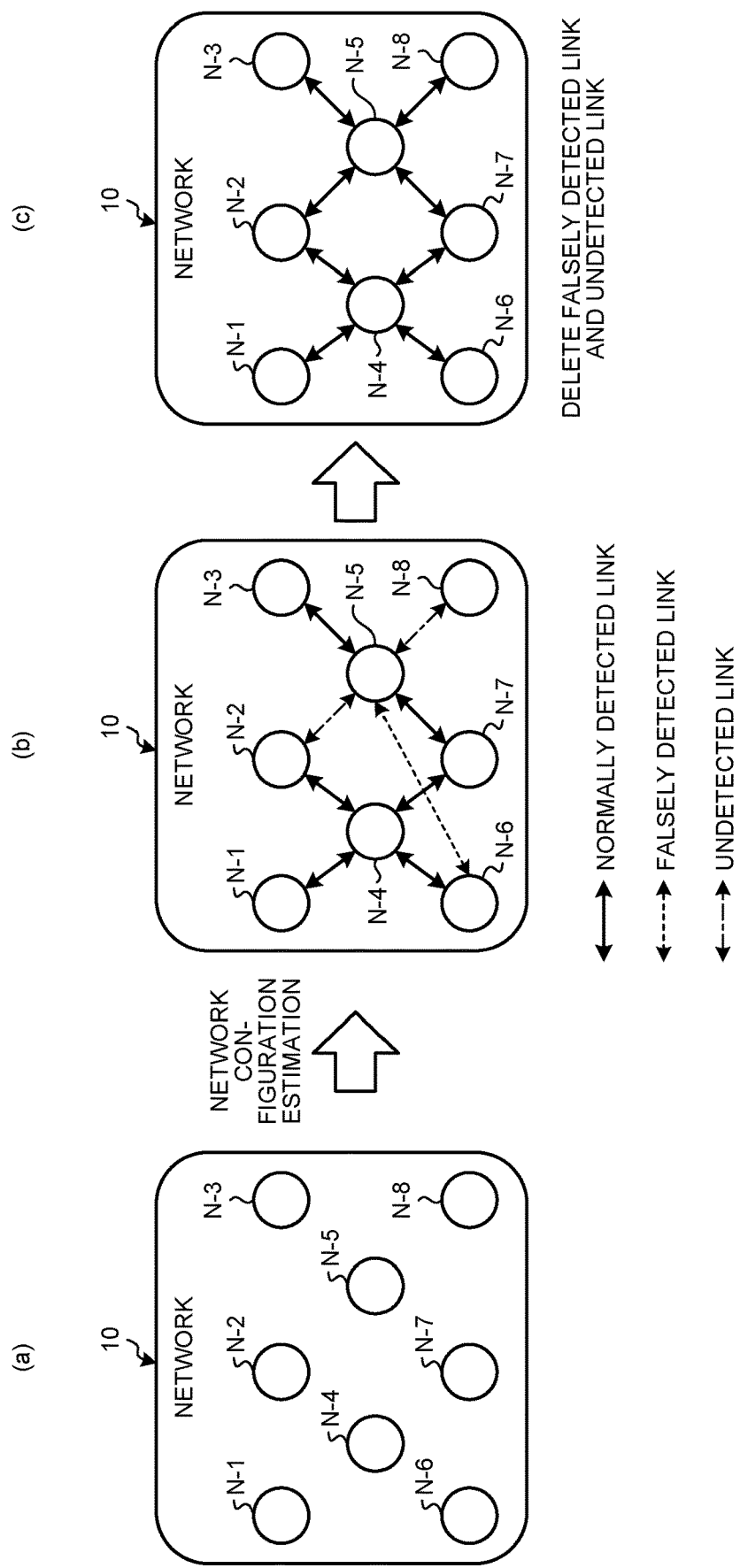
FIG. 2 is a diagram illustrating an overview of the processing of the network management system according to the first embodiment.

FIG. 2 is a diagram illustrating an overview of the processing of the network management system 500 according to the first embodiment. The network 10 illustrated in FIG. 2 is a network managed by the network management system 500, and is a wireless ad hoc network including nodes N–1 to N–8. Note that although the present embodiment assumes the nodes from nodes N–1 to N–8, the number of the nodes in the present embodiment is not limited. In the present embodiment, the nodes are each referred to as node N when no distinction is made among the nodes N–1 to N–8. In FIG. 2, a solid arrow connecting nodes N indicates a normally detected link, which denotes a combination of nodes determined that has a link therebetween in the link estimation information, and presumed that has a link therebetween also in reality. A broken line arrow connecting nodes N indicates a falsely detected link. A dashed-and-dotted line arrow connecting nodes N indicates an undetected link. A falsely detected link denotes a combination of nodes indicated as having a link therebetween in the link estimation information, but presumed that has no link therebetween in reality. Moreover, in other words, a falsely detected link denotes a combination of nodes indicated as having a link therebetween in the link estimation information, which information is nevertheless presumed to be incorrect. An undetected link denotes a combination of nodes indicated as having no link therebetween in the link estimation information, but presumed that has a link therebetween in reality. Moreover, in other words, an undetected link denotes a combination of nodes indicated as having no link therebetween in the link estimation information, which information is nevertheless presumed to be incorrect.

In the state illustrated in FIG. 2(*a*), the network management system 500 has not estimated the configuration of the network 10, and therefore, relationships of links among the nodes N–1 to N–8 in the network 10 are unknown. As illustrated in FIG. 2(*b*), estimation of the network configuration of the network 10 by the network configuration estimation device 200 provides a network configuration that represents relationships of links between the nodes included in the network 10. As illustrated in FIG. 2(*b*), the network configuration estimated may include a falsely detected link or an undetected link. As illustrated in FIG. 2(*c*), the network management device 100 of the present embodiment deletes the falsely detected link or links from, and adds the undetected link(s) to, the network configuration estimated by the network configuration estimation device 200.

The network configuration estimation device 200 estimates the condition of a link between nodes based on nodes that are continuously emitting a radio wave, and outputs information on the link estimated, to the network management device 100. The location information output device 300 outputs node location information to the network management device 100. The network management device 100 detects a falsely detected link and an undetected link using the link estimation table, which provides information indicating the network configuration estimated by the network configuration estimation device 200, and the node location information obtained from the location information output device 300. The network management device 100 deletes the falsely detected link(s) from, and adds the undetected link(s) to, the link estimation table.

Figures 3, 4:
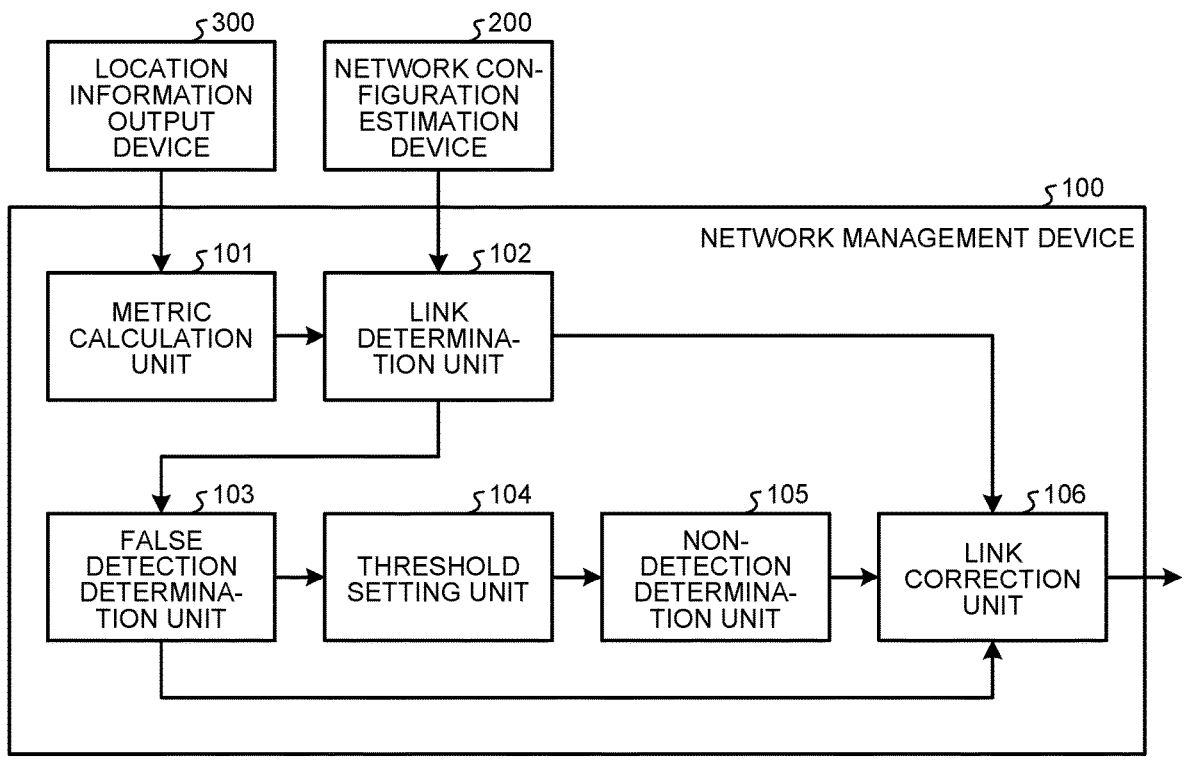
FIG. 3 is a diagram illustrating functional blocks of the network management device according to the first embodiment.
FIG. 4 is a chart illustrating an example of location information table according to the first embodiment.

FIG. 3 is a diagram illustrating functional blocks of the network management device 100 according to the first embodiment. The network management device 100 includes a metric calculation unit 101, a link determination unit 102, a false detection determination unit 103, a threshold setting unit 104, a non-detection determination unit 105, and a link correction unit 106.

The metric calculation unit 101 calculates a metric of each of all possible combinations of the nodes using the node location information obtained from the location information table output by the location information output device 300. The term "combinations of nodes" refers to the combinations of all nodes that can form a link therebetween, and the number of combinations of nodes for M nodes is M×(M−1)/2. A metric is the distance between nodes. Or, a metric is a combination of channel information and distance information. Or, a metric is a propagation loss calculated using a combination of channel information and distance information. Channel information is obtained from topographic information and from measurement data. Topographic information is, for example, three-dimensional map data including the longitude, the latitude, and the altitude for a region containing all the nodes. Measurement data includes, for example, the distance between points and the propagation loss between points measured at multiple points in a region containing all the nodes. A propagation loss is proportional to the square of the distance between nodes. However, in a case in which a shield exists between nodes or in a similar case, the propagation loss will be proportional to an X-th power of the distance between nodes. The channel information is, for example, the value of X obtained from topographic information and from measurement data. The link determination unit 102 generates a link presence-absence table using information in the link estimation table, which is a table listing the combinations of nodes that respectively form links, output by the network configuration estimation device 200. In addition, the link determination unit 102 generates the link presence-absence table using the metrics of all possible combinations of the nodes calculated by the metric calculation unit 101. The link presence-absence table is also referred to as link presence-absence information.

The false detection determination unit 103 determines that a link having a metric that is an outlier is a falsely detected link, based on the metrics of the detected links in the link presence-absence table. Alternatively, the false detection determination unit 103 determines that a link having a metric that is an outlier is a falsely detected link using link estimation information and metrics. An outlier is, for example, a value of metric of a link beyond the standard deviation calculated on the assumption that the distribution of metric can be classified as a certain distribution. The threshold setting unit 104 stores, as a threshold, the maximum value of the metrics of the links after deletion of the falsely detected link(s). The non-detection determination unit 105 outputs, as an undetected link, the link of a combination of nodes having a metric less than or equal to the threshold that has been set to the threshold setting unit 104, among the combination(s) of nodes between which no link has been detected. The link correction unit 106 outputs, to the outside world, a link presence-absence table generated by deleting the falsely detected link(s) from, and adding the undetected link(s) to, the link presence-absence table output by the link determination unit 102. The link correction unit 106 also outputs, to the outside world, link estimation information generated by deleting the falsely detected link(s) and adding the undetected link(s).

FIG. 4 is a chart illustrating an example of the location information table according to the first embodiment. The location information table is output by the location information output device 300. The location information output device 300 includes, for example, the node location information manually entered by the administrator of the network. Alternatively, the location information output device 300 automatically obtains the node location information. Examples of the method of automatically obtaining the node location information by the location information output device 300 include a method in which the location information output device 300 compares the phase difference of a radio wave observed by multiple antennas included in the location information output device 300, and estimates the incoming direction of that radio wave, thus to obtain the node location information. The location information table includes the name of a node, the X coordinate of the node, the Y coordinate of the node, and the Z coordinate of the node. An X coordinate, a Y coordinate, and a Z coordinate are, for example, coordinates of a coordinate system having the X-, Y-, and Z-directions arbitrarily determined with respect to a certain point serving as the reference point; or values of three-dimensional coordinates with respect to the origin that is the coordinate point where the location information output device 300 is located. This configuration allows the location information table to contain three-dimensional location information of each node. The location information table includes M rows of data when M nodes exist.

FIG. 5 is a chart illustrating an example of the link estimation table according to the first embodiment. The link estimation table provides information indicating the combinations of nodes presumed that have a link therebetween. The link estimation table is output by the network configuration estimation device 200. The network configuration estimation device 200 analyzes emission patterns of radio waves emitted by respective nodes to estimate the network configuration, and then outputs an estimation result as the link estimation table. An example of estimating a network configuration by analysis of emission patterns of radio waves emitted by respective nodes is, as the method described in Patent Literature 1, to separate the information on the radio wave emitted by a node into control information for communication connection of nodes, and user information to be sent after establishment of communication connection, and to use a characteristic of the control information and a characteristic of the user information, thus to estimate the network configuration. The link estimation table includes information on a node A and on a node B. The node A and the node B are, respectively, one node and the other node of a combination of two nodes. The link estimation table stores information on the node A and on the node B corresponding to a combination of nodes presumed, by the network configuration estimation device 200, that has a link therebetween. The combinations of nodes stored in the link estimation table as the node A and as the node B include combinations of nodes corresponding to the falsely detected link(s) and to the undetected link(s). The link estimation table includes data of as many nodes A and nodes B as the number of combinations of nodes presumed that have a link therebetween.

FIG. 6 is a chart illustrating an example of the link presence-absence table according to the first embodiment. The link presence-absence table is output by the link determination unit 102. The link presence-absence table includes information on the node A, the node B, the metric, and whether a link exists. The node A and the node B are, respectively, one node and the other node of a combination of two nodes. The metric column contains the value of the distance between the node A and the node B. The column of the information on whether a link exists contains information of "present" for a combination of nodes listed in the link estimation table, and contains information of "absent" for a combination of nodes not listed in the link estimation table. The link presence-absence table includes M×(M−1)/2 rows of data when M nodes exist.

Figure 7:
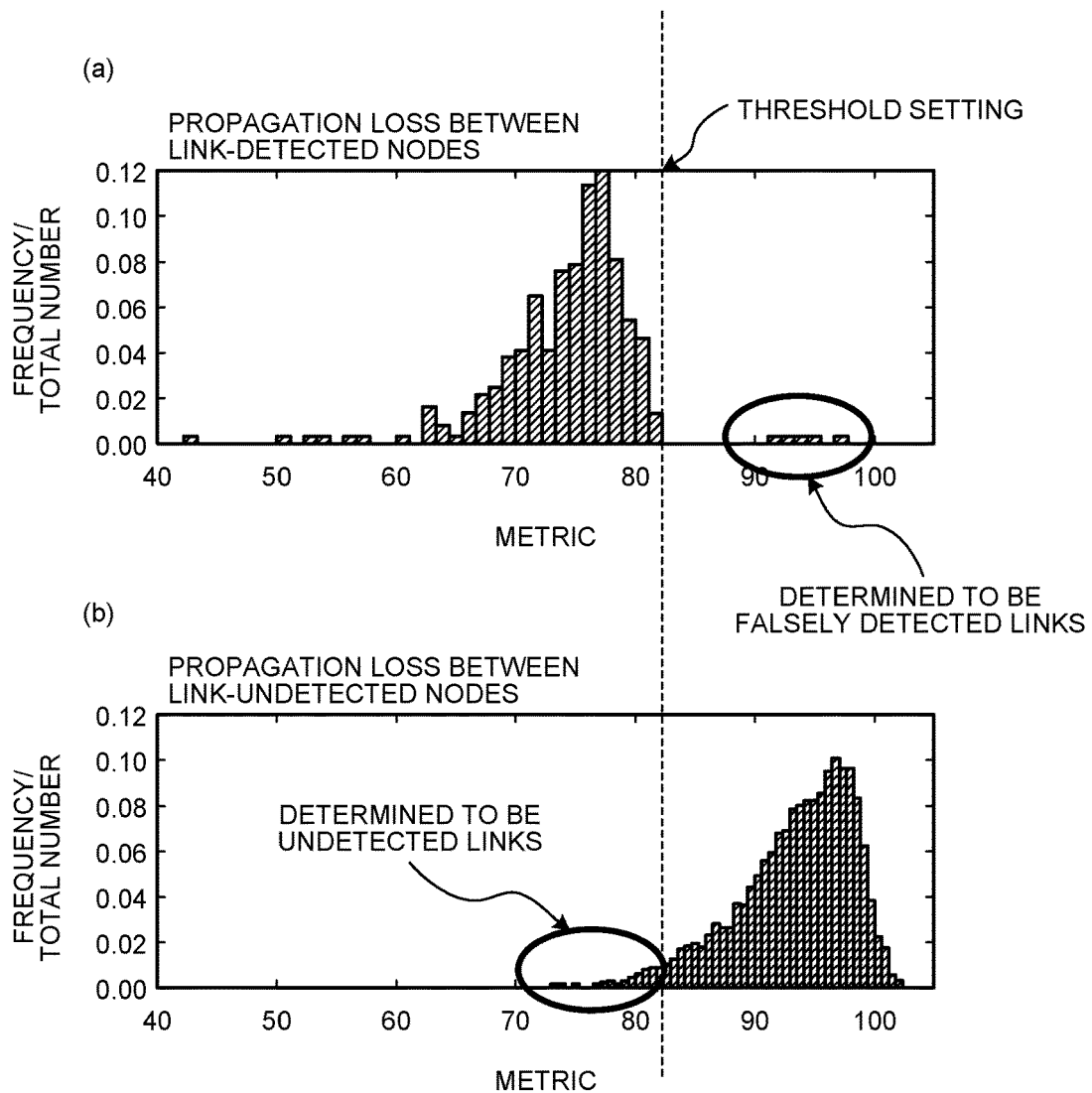
FIG. 7 is a diagram illustrating an example of the processing of a false detection determination unit, of a threshold setting unit, and of a non-detection determination unit according to the first embodiment.

FIG. 7 is a diagram illustrating an example of the processing of the false detection determination unit 103, the threshold setting unit 104, and the non-detection determination unit 105 according to the first embodiment. FIG. 7(*a*) is a graph having a vertical axis representing the propagation loss between a pair of link-detected nodes, and a horizontal axis representing the metric thereof. It is seen that the false detection determination unit 103 determines the links of the respective combinations of nodes having a metric ranging from 90 to 100 to be falsely detected links, among the links listed as detected in the link presence-absence table. In addition, the threshold setting unit 104 stores a value of 80 as the threshold, which value is the maximum value of the metrics of the links after deletion of the falsely detected links.

FIG. 7(*b*) is a graph having a vertical axis representing the propagation loss between a pair of link-undetected nodes, and a horizontal axis representing the metric thereof. It is seen that the non-detection determination unit 105 determines the links of the respective combinations of nodes having a metric less than or equal to 80, set by the threshold setting unit 104 as the threshold, to be undetected links, among the links of the respective combinations of nodes listed as undetected.

A hardware configuration of the metric calculation unit 101, the link determination unit 102, the false detection determination unit 103, the threshold setting unit 104, the non-detection determination unit 105, and the link correction unit 106 according to the first embodiment will now be described. The metric calculation unit 101, the link determination unit 102, the false detection determination unit 103, the threshold setting unit 104, the non-detection determination unit 105, and the link correction unit 106 are implemented in a processing circuit that is an electronic circuit that performs the processing thereof.

This processing circuit may be a dedicated hardware element, or a control circuit including a memory and a central processing unit (CPU) that executes a program stored in the memory. In this regard, the memory is, for example, a non-volatile or volatile semiconductor memory such as a random access memory (RAM), a read-only memory (ROM), or a flash memory; a magnetic disk, an optical disk, or the like. In a case in which this processing circuit is a control circuit including a CPU, this control circuit is, for example, a control circuit 900 configured as illustrated in FIG. 8.

Figure 8:
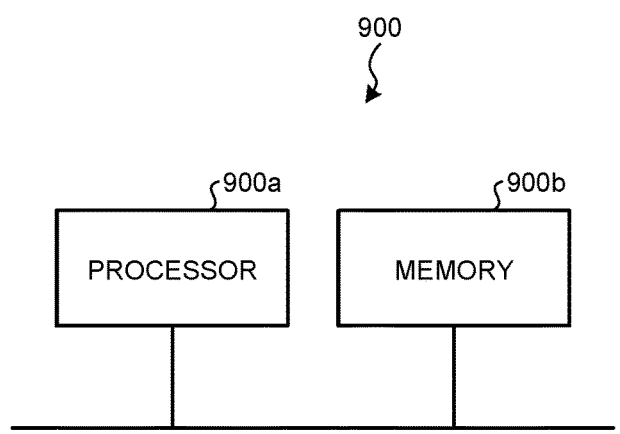
FIG. 8 is a diagram illustrating an example configuration of the control circuit of the first embodiment.

As illustrated in FIG. 8, the control circuit 900 includes a processor 900*a* being a CPU, and a memory 900*b*. In a case in which the processing circuit is implemented by the control circuit 900 illustrated in FIG. 8, the functionality is implemented by the processor 900a by reading and executing a program or programs corresponding to the processes, stored in the memory 900b. The memory 900b is also used as a temporary memory in the processing performed by the processor 900a.

Figure 9:
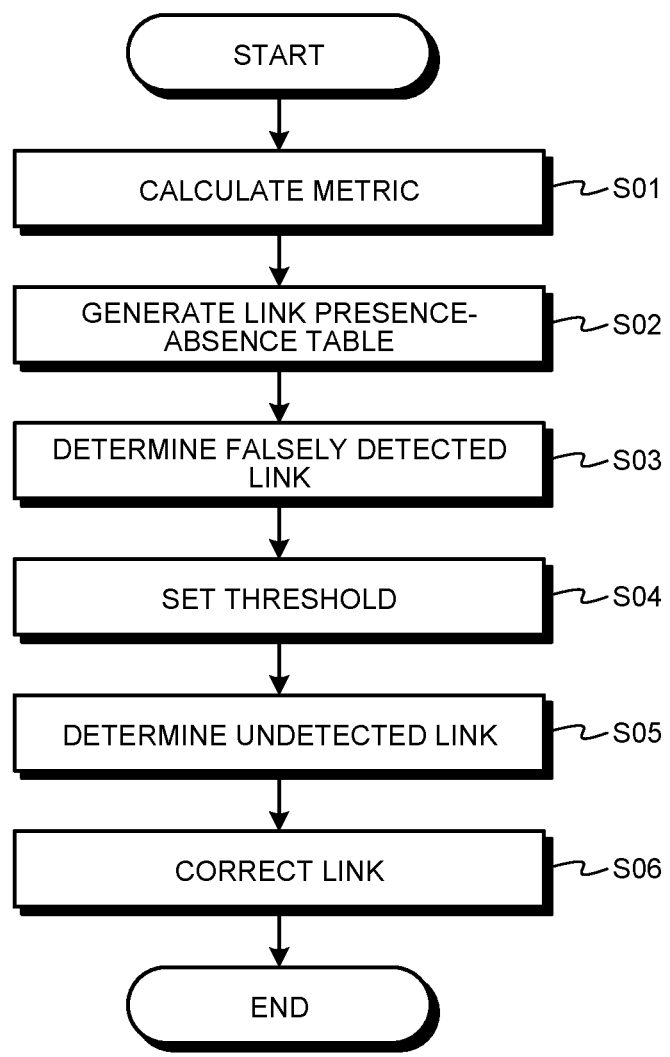
FIG. 9 is a flowchart illustrating an example of control of the network management device according to the first embodiment.

An operation of the network management device 100 according to the first embodiment will now be described. FIG. 9 is a flowchart illustrating an example of control of the network management device according to the first embodiment. Note that the flowchart illustrated in FIG. 9 may be modified to change the processing order, or to perform some processing in parallel, as necessary and appropriate.

The metric calculation unit 101 calculates a metric for each of all the combinations of nodes that are connectable to each other, based on the location information of all the nodes received from the location information output device 300 (step S01).

The link determination unit 102 generates a link presence-absence table from the link estimation table obtained from the network configuration estimation device 200, and from the metric information obtained from the metric calculation unit 101 (step S02).

The false detection determination unit 103 determines the falsely detected link(s) based on the distribution of the metric for the combination(s) of nodes indicated as "link present" in the link presence-absence column of the link presence-absence table (step S03).

The threshold setting unit 104 sets, as the threshold, the maximum value of the metrics of the links after deletion of the falsely detected link(s) from the information on the detected links (step S04).

The non-detection determination unit 105 determines the link(s) having a metric less than or equal to the threshold to be undetected link(s) (step S05).

The link correction unit 106 rewrites the link presence-absence table output by the link determination unit 102 to change the link presence-absence information of a link that has been determined to be a falsely detected link by the false detection determination unit 103, to information indicating "link absent", and to change the link presence-absence information of a link that has been determined to be an undetected link by the non-detection determination unit 105, to information indicating "link present". The link correction unit 106 then outputs the resultant link presence-absence table (step S06). In addition, the link correction unit 106 deletes the falsely detected link(s) from, and adds the undetected link(s) to, the link estimation table, and outputs the updated link estimation table.

As described above, in the present embodiment, the metric calculation unit 101 calculates a metric using the location information obtained from the location information output device 300. The link determination unit 102 generates the link presence-absence table from the metrics and from the link estimation table obtained from the network configuration estimation device 200. The false detection determination unit 103 makes a determination of a falsely detected link. The threshold setting unit 104 sets the maximum metric value as the threshold among the links after deletion of the falsely detected link(s). The non-detection determination unit 105 determines each of the link(s) of the combination(s) of nodes having a metric less than or equal to the threshold set by the threshold setting unit 104 the undetected link. The link correction unit 106 deletes the falsely detected link(s) and adds the undetected link(s). Thus, the network management device 100 can reduce decrease in accuracy of estimation of the network configuration.

Second Embodiment

Figure 10:
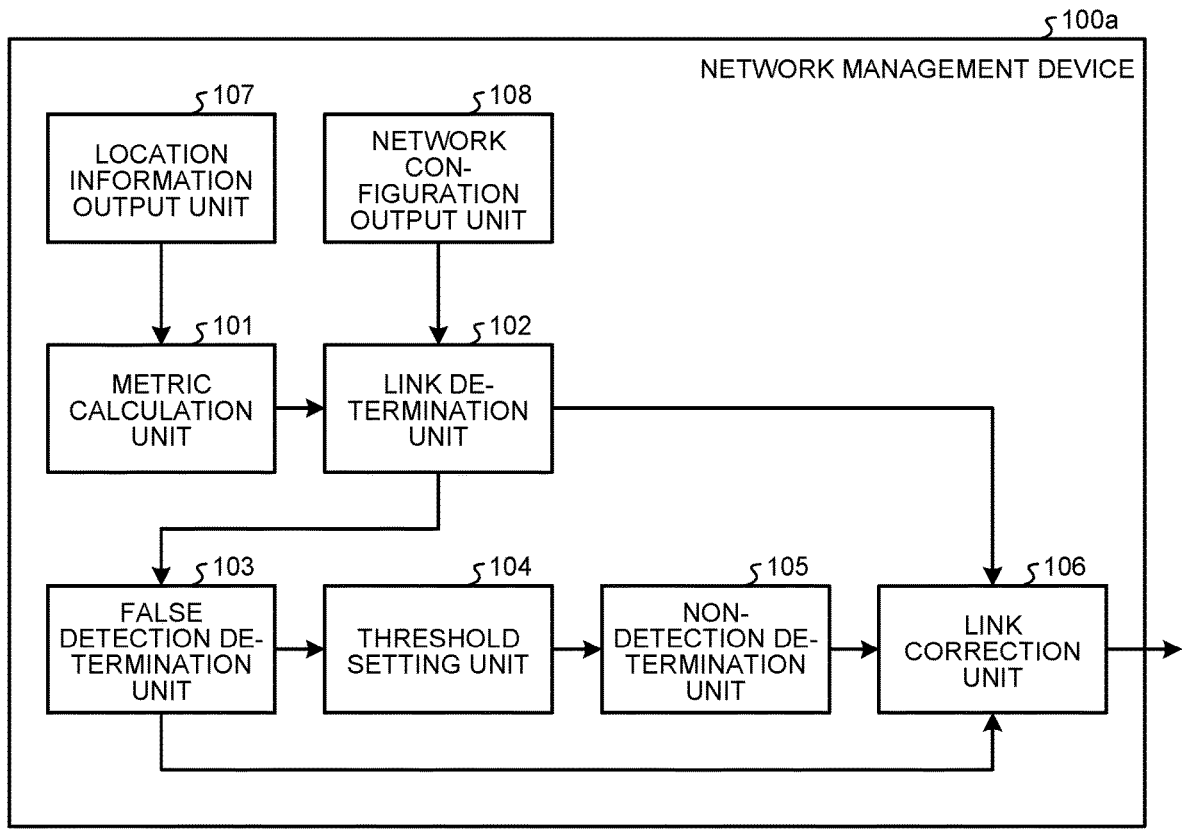
FIG. 10 is a diagram illustrating functional blocks of a network management device according to a second embodiment.

FIG. 10 is a diagram illustrating functional blocks of a network management device according to a second embodiment. Note that the elements having the same functionality as the corresponding elements of the first embodiment are designated by the same reference characters as the first embodiment, and duplicate description thereof will be omitted. A network management device 100a includes a location information output unit 107 and a network configuration output unit 108 in addition to the functional units similar to the corresponding functional units of the first embodiment. The location information output unit 107 has functionality similar to the functionality of the location information output device 300 of the first embodiment. The network configuration output unit 108 has functionality similar to the functionality of the network configuration estimation device 200 of the first embodiment.

The location information output unit 107 and the network configuration output unit 108 according to the second embodiment are implemented in a processing circuit similar to the processing circuit of the first embodiment.

In the present embodiment, the inclusion of the location information output unit 107 and the network configuration output unit 108 in the network management device 100a allows the location information of each node and the link information to be input from the inside of the network management device 100a. By using the node location information and the network configuration estimation information, the network management device 100a can provide an advantage similar to the advantage of the first embodiment.

Third Embodiment

Figure 11:
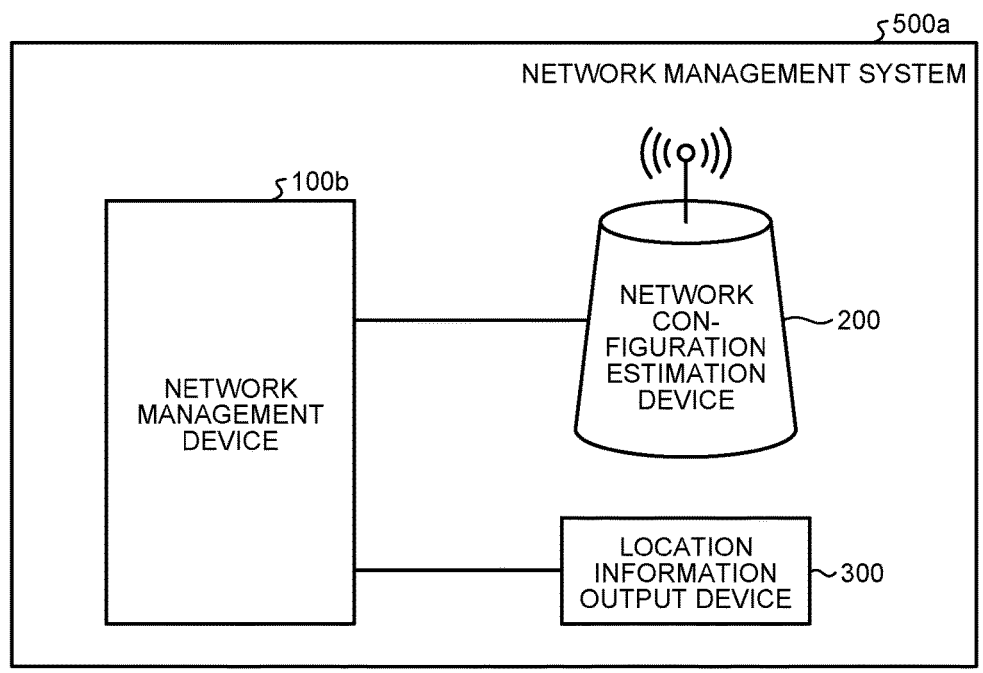
FIG. 11 is a diagram illustrating an example of the configuration of a network management system according to a third embodiment.

FIG. 11 is a diagram illustrating an example of the configuration of a network management system according to a third embodiment. Note that the elements having the same functionality as the corresponding elements of the first embodiment are designated by the same reference characters as the first embodiment, and duplicate description thereof will be omitted. A network management system 500a includes a network management device 100b, the network configuration estimation device 200, and the location information output device 300. The network management device 100b is connected to the network configuration estimation device 200 and to the location information output device 300. The network management device 100b outputs a significance value of each node taking into consideration the falsely detected link(s) and the undetected link(s).

Figure 12:
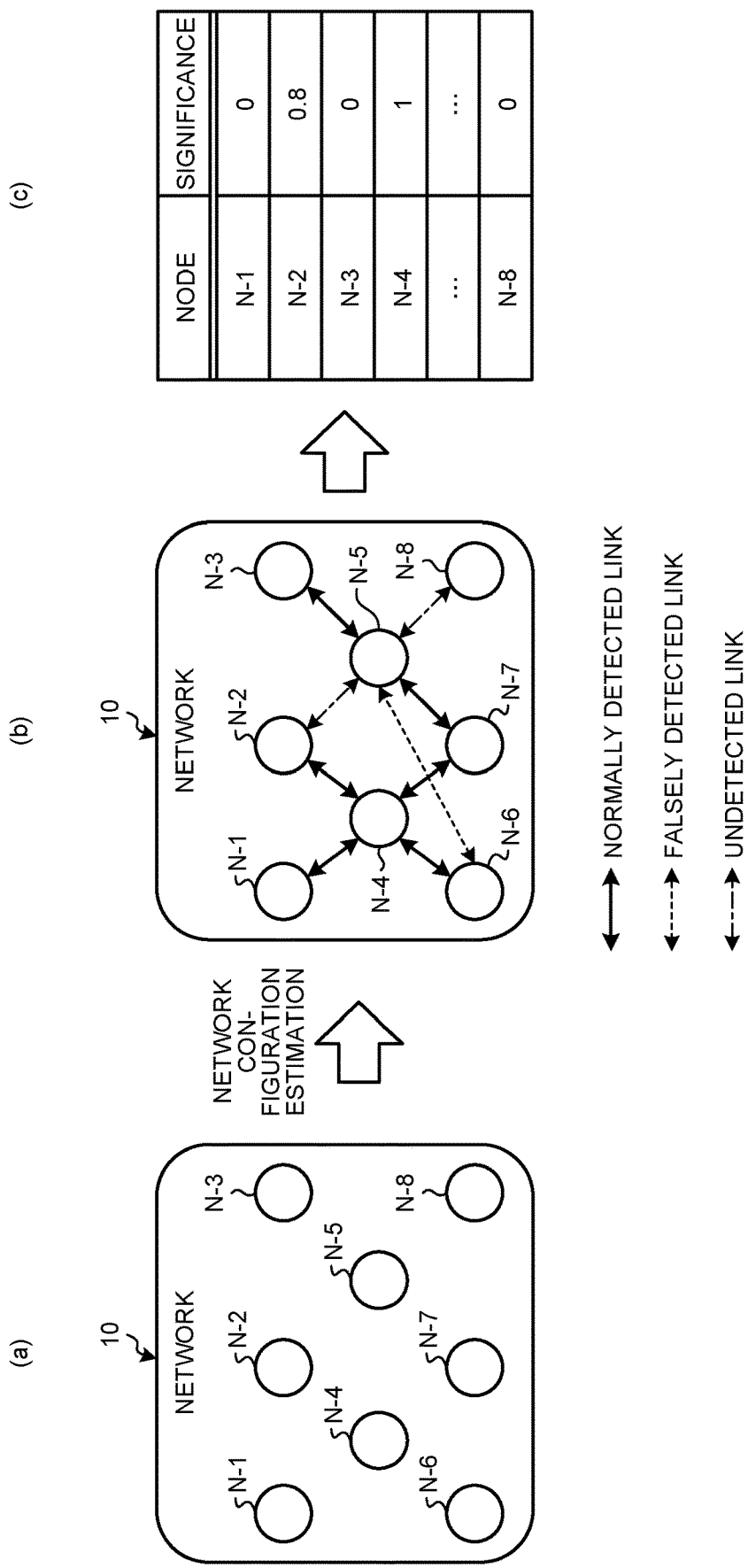
FIG. 12 is a diagram illustrating an overview of the processing of the network management device according to the third embodiment.

FIG. 12 is a diagram illustrating an overview of the processing of the network management device 100b according to the third embodiment. The network configuration estimation device 200 estimates the network configuration through an operation similar to the operation of the first embodiment. The network management device 100b estimates the network configuration as illustrated in FIG. 12(b) from the state of the network of FIG. 12(a), and outputs a significance value of each node taking into consideration the presence of falsely detected link(s) and undetected link(s) as illustrated in FIG. 12(c).

Figure 13:
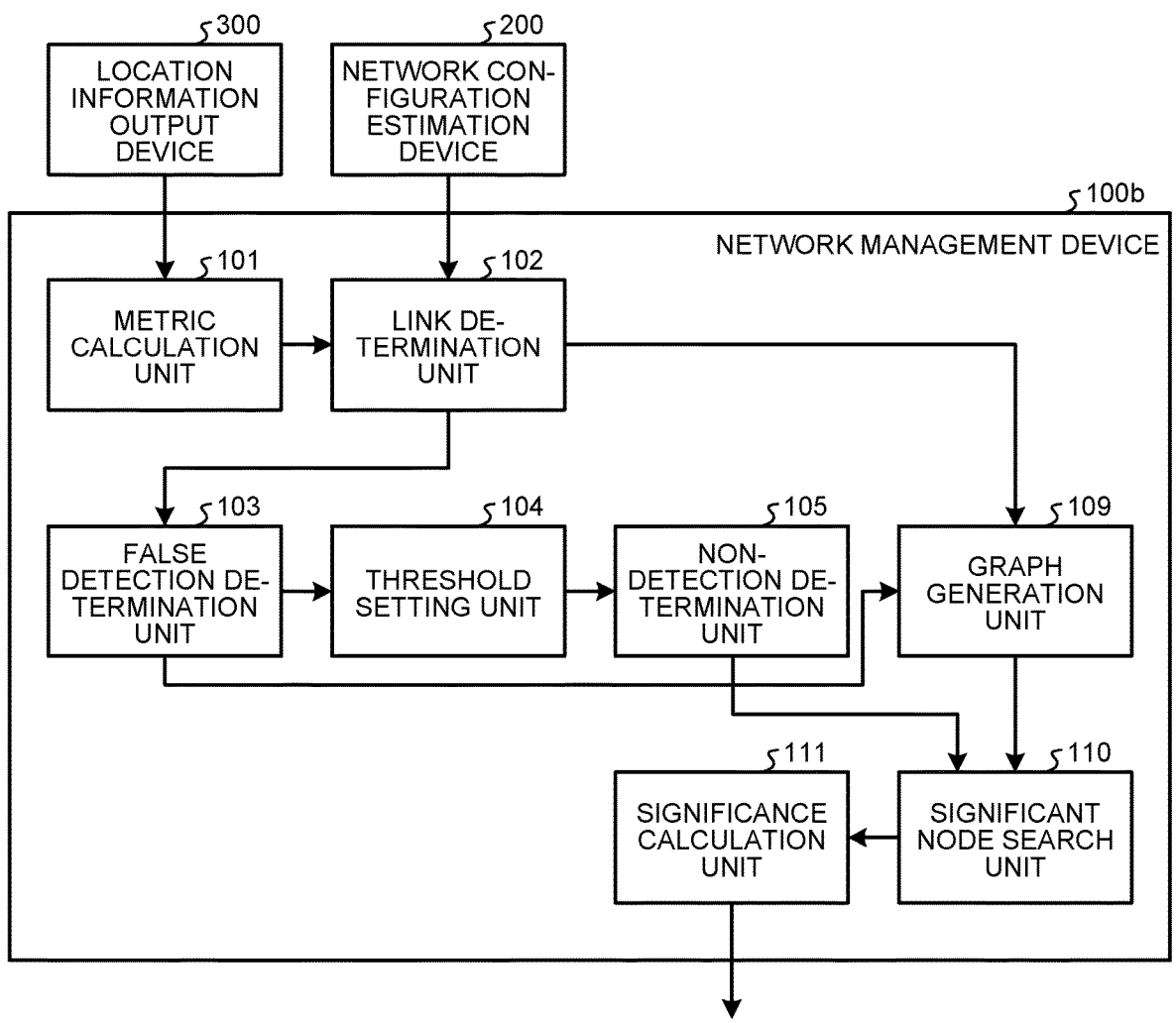
FIG. 13 is a diagram illustrating functional blocks of the network management device according to the third embodiment.

FIG. 13 is a diagram illustrating functional blocks of the network management device 100b according to the third embodiment. The network management device 100b includes the metric calculation unit 101, the link determination unit 102, the false detection determination unit 103, the threshold setting unit 104, the non-detection determination unit 105, a graph generation unit 109, a significant node search unit 110, and a significance calculation unit 111. The graph generation unit 109 generates a network graph from the link presence-absence information obtained from the link determination unit 102. Note that the graph generation unit 109 may generate a network graph from information after deletion of the falsely detected link(s) from the link estimation information. The significant node search unit 110 searches for a significant node from the network graph generated. The significance calculation unit 111 calculates a significance value for each node from the information of the significant node that has been found. A significant node is a node that will significantly affect the network upon failure of that node in the network.

The graph generation unit 109, the significant node search unit 110, and the significance calculation unit 111 according to the third embodiment are implemented in a processing circuit similar to the processing circuit of the first embodiment.

Figure 14:
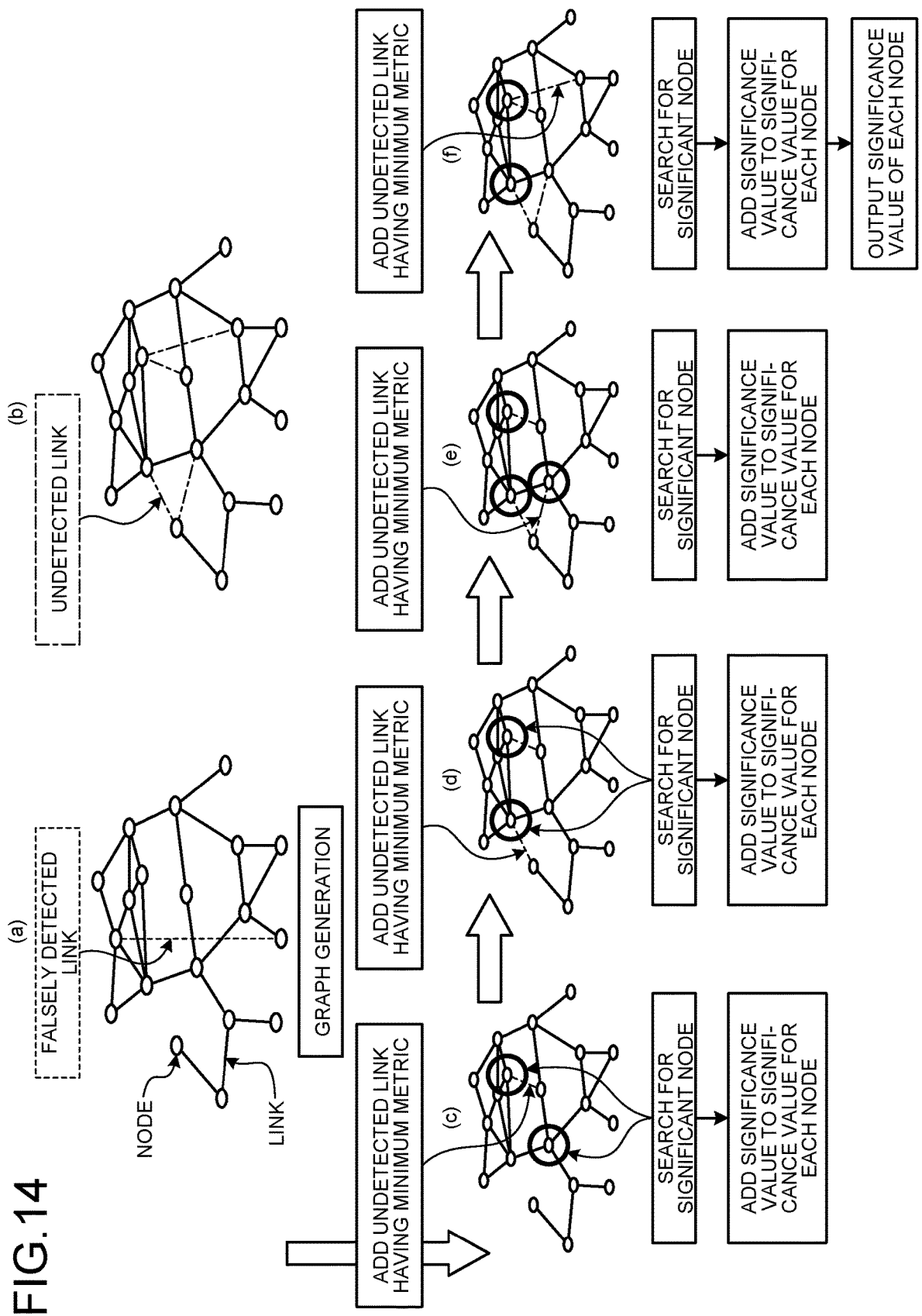
FIG. 14 is a diagram illustrating an example of calculation of a significance value, of the network management device according to the third embodiment.

FIG. 14 is a diagram illustrating an example of calculation of a significance value, of the network management device 100b according to the third embodiment. The graph generation unit 109 deletes the falsely detected link(s) determined by the false detection determination unit 103, from the link presence-absence table output from the link determination unit 102, and thus generates a graph of the network. FIG. 14(a) illustrates the network graph using a solid line for a normally detected link, and a dotted line for a falsely detected link. FIG. 14(b) illustrates the network graph using a solid line for a normally detected link, and a dashed-and-dotted line for an undetected link of the network graph. The graph in this example may be output in a format such as an adjacency matrix or an edge list depending on the representation method.

FIGS. 14(c) to 14(f) illustrate an operation in which the significant node search unit 110 searches for a significant node, and the significance calculation unit 111 adds significance values. The significant node search unit 110 adds one undetected link having the minimum metric to the network graph generated by the graph generation unit 109, and then searches for a significant node. Examples of significant node include a node that would cause a graph to become a disconnected graph upon removal of the node that is found, from the graph, and a node whose centrality, such as betweenness centrality, is the highest. A betweenness centrality is a ratio of the number of links formed by the node that is found, to the number of links after removal of the link(s) formed by the node that is found, from all the links in the network graph. Note that there may be more than one significant node.

The significance calculation unit 111 prepares in advance the significance values of the nodes in tabular form, and adds the significance value for the significant node found by the significant node search unit 110. Examples of the method to add a significance value include a method of addition using a score, which is 1 for the significant node, and 0 for the other nodes, and a method to add values respectively calculated for all the nodes in the network graph, such as in a case of betweenness centrality. Alternatively, another applicable method is to weight the significance value on every addition operation. In the case of addition of a significance value using a score that is 1 for the significant node, and 0 for the other nodes, examples of weighting a significance value include a method to add a value that is incremented by 1 each time the score of the significant node is added for the significant node. The significant node search unit 110 and the significance calculation unit 111 continue the search for a significant node and the calculation of the significance value until all the undetected link(s) is/are added to the network graph. In addition, the significance calculation unit 111 outputs the information of the significance of each node. The significance value output by the significance calculation unit 111 may be the value in the table of significance without change, or may be a value converted from the value in the table of significance. The information of the significance output by the significance calculation unit 111 is also referred to as significance information. The significant node search unit 110 may also count the number of times of determining a node to be a significant node on a per-node basis. In addition, the significance calculation unit 111 may include the number of times of determining a node to be a significant node, in the significance information.

Figure 15:
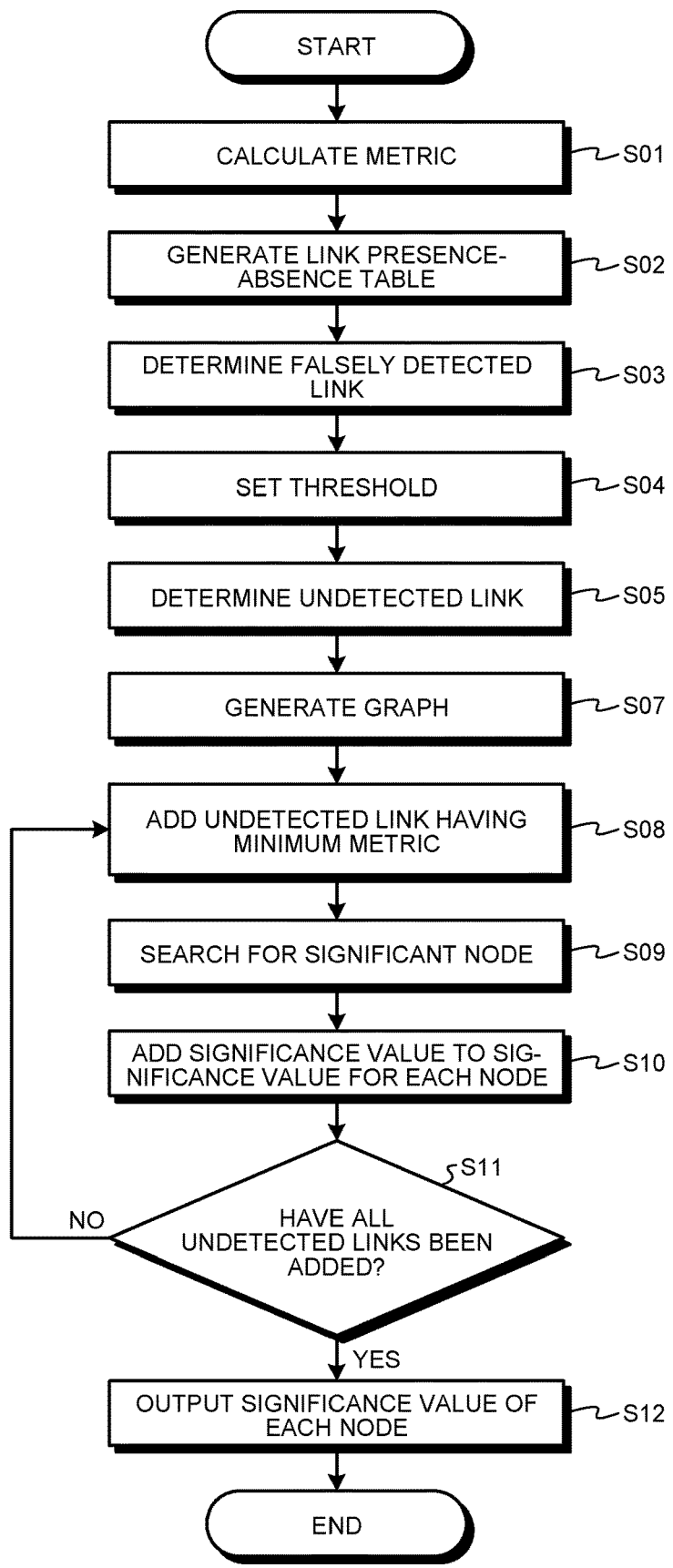
FIG. 15 is a flowchart illustrating an example of control of the network management device according to the third embodiment.

An operation of the network management device 100b will now be described. FIG. 15 is a flowchart illustrating an example of control of the network management device 100b according to the third embodiment. Note that the flowchart illustrated in FIG. 15 may be modified to change the processing order, or to perform some processing in parallel, as necessary and appropriate. The process from steps S01 to S05 of this flowchart is the same as the corresponding process of the flowchart of FIG. 9.

The graph generation unit 109 generates, from the link presence-absence table output by the link determination unit 102, a graph of the network using the link(s) determined by the false detection determination unit 103 to be falsely detected (step S07).

The significant node search unit 110 adds one undetected link having the minimum metric to the graph generated (step S08), and searches for a significant node (step S09).

The significance calculation unit 111 prepares in advance the significance value for each node in tabular form, and adds the significance value for the significant node found (step S10).

When all the undetected links are added (step S11, Yes), the significance calculation unit 111 calculates the significance value for each node from the table of significance, and outputs the significance values (step S12). When all the undetected links have not yet been added (step S11, No), the process returns to step S08.

As described above, the network management device 100b deletes the falsely detected link(s) obtained from the false detection determination unit 103 from, and adds the undetected link(s) obtained from the non-detection determination unit 105 to, the network graph generated by the graph generation unit 109. In addition, the network management device 100b searches for a significant node by the significant node search unit 110, and calculates the significance value for each node by the significance calculation unit 111. This operation enables a user to identify a significant node in the network configuration, and to maintain or manage the network configuration even when the network configuration estimated by the network configuration estimation device 200 is defective.

Fourth Embodiment

Figure 16:
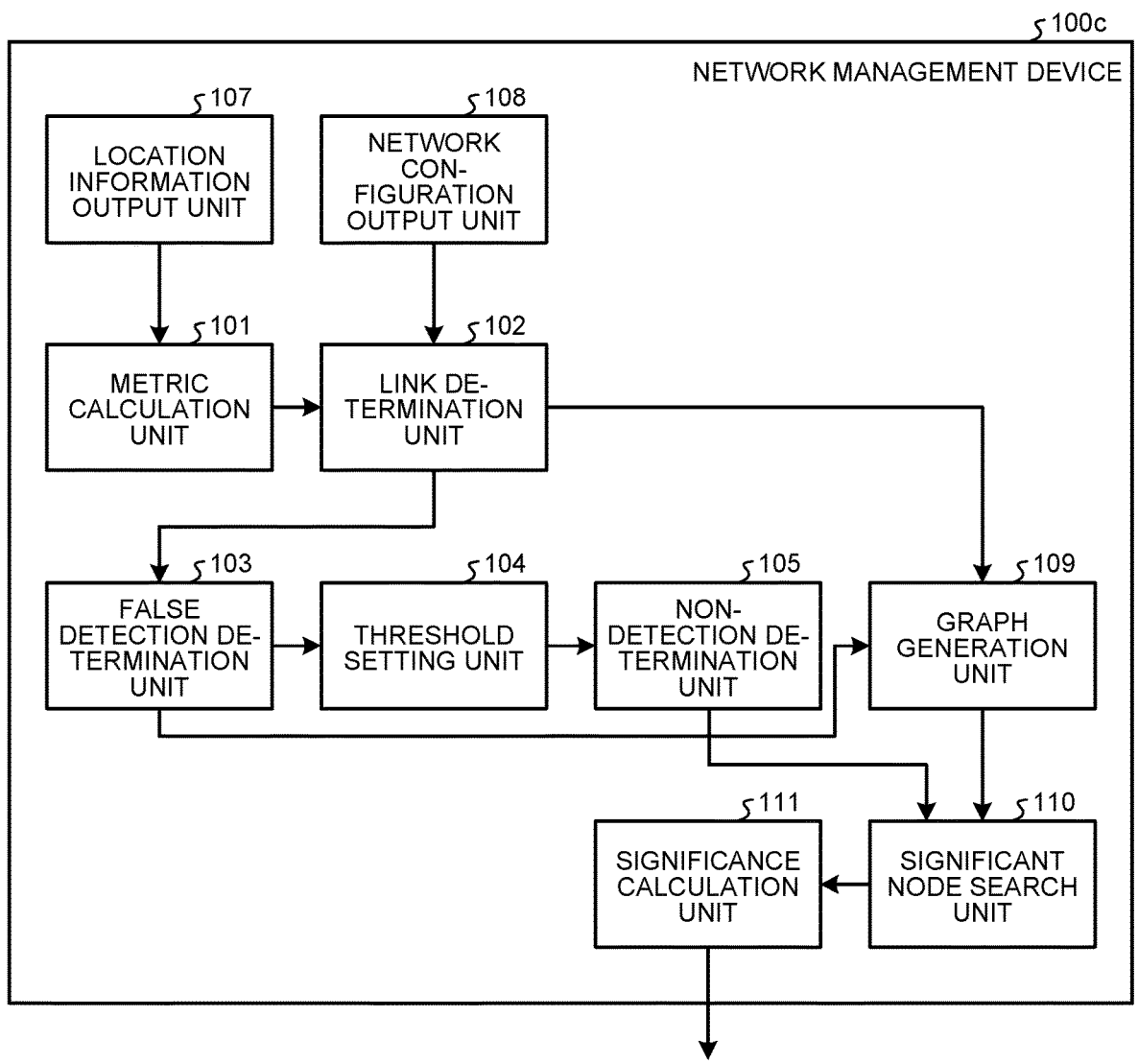
FIG. 16 is a diagram illustrating functional blocks of a network management device according to a fourth embodiment.

FIG. 16 is a diagram illustrating functional blocks of a network management device according to a fourth embodiment. Note that the elements having the same functionality as the corresponding elements of the third embodiment are designated by the same reference characters as the third embodiment, and duplicate description thereof will be omitted. A network management device 100c includes the location information output unit 107 and the network configuration output unit 108 in addition to the functional units similar to the corresponding functional units of the third embodiment.

In the present embodiment, the network management device 100c includes the location information output unit 107 and the network configuration output unit 108, and this configuration allows the location information of each node and the link information to be input from the inside of the network management device 100c. By using the node location information and the network configuration estimation information, the network management device 100c can provide an advantage similar to the advantage of the third embodiment.

The configurations described in the foregoing embodiments are merely examples of various aspects of the present invention. These configurations may be combined with a known other technology, and moreover, a part of such configurations may be omitted and/or modified without departing from the spirit of the present invention.

A network management device according to the present invention provides an advantage in being capable of reducing decrease in accuracy of estimation of the network configuration.

What is claimed is:

1. A network management device comprising:
a metric calculation circuitry to calculate, using location information of a plurality of nodes constituting a network, metrics for respective combinations of the nodes;
a false detection determination circuitry to determine, using the metrics and using link estimation information being information indicating a combination of the nodes presumed that has a link therebetween, a falsely detected link corresponding to a combination of the nodes indicated as having a link therebetween in the link estimation information, but presumed that has no link therebetween in reality; and
a non-detection determination circuitry to determine, using the metrics and the link estimation information, an undetected link corresponding to a combination of the nodes indicated as having no link therebetween in the link estimation information, but presumed that has a link therebetween in reality.

2. The network management device according to claim 1, comprising: a link determination circuitry to generate link presence-absence information including information on the metrics, on the combinations of the nodes, and on whether a link exists for each of the combinations of the nodes.

3. The network management device according to claim 1, wherein
the false detection determination circuitry determines the falsely detected link based on an outlier of distribution of the metrics.

4. The network management device according to claim 1, comprising: a threshold setting circuitry to set, as a threshold, a maximum value of the metrics of the respective combinations of the nodes resulting after deletion of the falsely detected link from the link estimation information.

5. The network management device according to claim 4, wherein
the non-detection determination circuitry determines a link corresponding to a combination of the nodes having a metric less than or equal to the threshold to be the undetected link.

6. The network management device according to claim 1, comprising: a link correction circuitry to update the link estimation information using the falsely detected link and the undetected link.

7. The network management device according to claim 1, comprising:
a graph generation circuitry to generate a network graph after deletion of the falsely detected link from the link estimation information;
a significant node search circuitry to add the undetected link to the network graph, and to search for a significant node that will affect the network upon failure; and
a significance calculation circuitry to calculate a value of significance of the significant node that have been found from the network graph having the undetected link added, and to output significance information being information on the significance.

8. The network management device according to claim 7, wherein
the significant node search circuitry adds the undetected link having a minimum metric of the metrics sequentially to the network graph.

9. The network management device according to claim 7, wherein
the significant node search circuitry counts a number of times of determination that a node is the significant node, on a per-node basis; and
the significance calculation circuitry includes the number of times of the determination in the significance information.

10. The network management device according to claim 1, comprising:
a location information output circuitry to output the location information; and
a network configuration output circuitry to output the information indicating the combination of the nodes presumed that has a link therebetween.

11. A control circuit that causes a network management device to perform a process of
calculating, using location information of a plurality of nodes constituting a network, metrics for respective combinations of the nodes;
determining, using the metrics and using link estimation information being information indicating a combination of the nodes presumed that has a link therebetween, a falsely detected link corresponding to a combination of the nodes indicated as having a link therebetween in the link estimation information, but presumed that has no link therebetween in reality; and
determining, using the metrics and the link estimation information, an undetected link corresponding to a combination of the nodes indicated as having no link therebetween in the link estimation information, but presumed that has a link therebetween in reality.

12. A non-transitory computer-readable recording medium that stores therein a program for controlling a network management device to execute a process of
calculating, using location information of a plurality of nodes constituting a network, metrics for respective combinations of the nodes;
determining, using the metrics and using link estimation information being information indicating a combination of the nodes presumed that has a link therebetween, a falsely detected link corresponding to a combination of the nodes indicated as having a link therebetween in the link estimation information, but presumed that has no link therebetween in reality; and determining, using the metrics and the link estimation information, an undetected link corresponding to a combination of the nodes indicated as having no link therebetween in the link estimation information, but presumed that has a link therebetween in reality.

* * * * *